United States Patent
Stemmer et al.

(10) Patent No.: US 12,475,695 B2
(45) Date of Patent: Nov. 18, 2025

(54) DEEPFAKE DETECTION MODELS UTILIZING SUBJECT-SPECIFIC LIBRARIES

(71) Applicant: Intel Corporation, Santa Clara, CA (US)

(72) Inventors: Georg Stemmer, Munich (DE); Carl Marshall, Portland, OR (US); Satyam Srivastava, Rancho Cordova, CA (US); Ilke Demir, Hermosa Beach, CA (US)

(73) Assignee: INTEL CORPORATION, Santa Clara, CA (US)

( * ) Notice: Subject to any disclaimer, the term of this patent is extended or adjusted under 35 U.S.C. 154(b) by 975 days.

(21) Appl. No.: 17/481,475

(22) Filed: Sep. 22, 2021

(65) Prior Publication Data
US 2022/0004904 A1 Jan. 6, 2022

(51) Int. Cl.
| | |
|---|---|
| G06N 20/00 | (2019.01) |
| G06F 18/20 | (2023.01) |
| G06F 18/21 | (2023.01) |
| G06F 18/214 | (2023.01) |
| G06N 5/04 | (2023.01) |
| G06V 10/82 | (2022.01) |

(Continued)

(52) U.S. Cl.
CPC .......... G06V 10/82 (2022.01); G06F 18/2148 (2023.01); G06F 18/217 (2023.01); G06F 18/285 (2023.01); G06N 5/04 (2013.01); G06N 20/00 (2019.01); G06V 20/30 (2022.01); G06V 20/41 (2022.01)

(58) Field of Classification Search
None
See application file for complete search history.

(56) References Cited

U.S. PATENT DOCUMENTS

| | | | |
|---|---|---|---|
| 11,687,778 B2 * | 6/2023 | Ciftci | G06V 40/40 |
| | | | 382/115 |
| 2021/0250220 A1 * | 8/2021 | Yang | H04L 41/052 |

(Continued)

OTHER PUBLICATIONS

Agarwal, S., El-Gaaly, T., Farid, H., & Lim, S. N. (2020). Detecting deep-fake videos from appearance and behavior. arXiv preprint arXiv:2004.14491.

(Continued)

*Primary Examiner* — Xuyang Xia
(74) *Attorney, Agent, or Firm* — JAFFERY WATSON HAMILTON & DESANCTIS LLP

(57) ABSTRACT

An apparatus to facilitate deepfake detection models utilizing subject-specific libraries is disclosed. The apparatus includes one or more processors to store a plurality of deepfake detection models corresponding to a plurality of subjects of interest; receive a query to identify whether data pertaining to a target subject of interest is a deepfake, the target subject of interest comprised in the plurality of subjects of interest and associated with a subject identifier (ID); identify a deepfake detection model corresponding to the subject ID; extract features for deepfake detection from the data; input the extracted features to the identified deepfake detection model corresponding to the subject ID; and responsive to an output of the deepfake detection model exceeding a determined deepfake threshold, generate a notification, in response to the query, indicating a possible deepfake attack corresponding to the target subject of interest.

20 Claims, 11 Drawing Sheets

(51) Int. Cl.
  *G06V 20/30* (2022.01)
  *G06V 20/40* (2022.01)

(56) References Cited

U.S. PATENT DOCUMENTS

| | | | | |
|---|---|---|---|---|
| 2021/0406568 | A1* | 12/2021 | Liberman | G06Q 20/3821 |
| 2021/0406719 | A1* | 12/2021 | Yocam | G06N 5/04 |
| 2022/0138472 | A1* | 5/2022 | Mittal | G10L 25/30 |
| | | | | 382/181 |
| 2022/0207263 | A1* | 6/2022 | Vexler | G06V 40/171 |
| 2022/0328050 | A1* | 10/2022 | Hennig | G10L 17/24 |

OTHER PUBLICATIONS

Agarwal, S., Farid, H., Gu, Y., He, M., Nagano, K., & Li, H. (2019, June). Protecting World Leaders Against Deep Fakes. In CVPR Workshops (pp. 38-45).
https://www.forbes.com/sites/jessedamiani/2019/09/03/a-voice-deepfake-was-used-to-scam-a-ceoout-of-243000/?sh=1a5e64b72241.
R. K. Das, T. Kinnunen, W.-C. Huang, Z. Ling, J. Yamagishi, Y. Zhao, X. Tian and T. Toda, "Predictions of Subjective Ratings and Spoofing Assessments of Voice Conversion Challenge 2020 Submissions," in Joint Workshop for the Blizzard Challenge and Voice Conversion Challenge 2020, 2020.

\* cited by examiner

700

```
Collect communication data corresponding to an identifier (ID) of a subject
communicating with a computing device
                                                                      710
```

```
Extract one of more features from the collected communication data for
utilization in deepfake detection
                                                                      720
```

```
Train a subject-specific deepfake detection model for the subject
                                                                      730
```

```
Store the ID of the subject and the subject-specific deepfake detection model
at the computing device
                                                                      740
```

```
┌─────────────────────────────────────────────────────────────┐
│ Receive deepfake query comprising an identification of a    │
│ subject of interest and data pertaining to the subject of   │
│ interest                                                    │
│                                                         910 │
└─────────────────────────────────────────────────────────────┘
                              │
                              ▼
┌─────────────────────────────────────────────────────────────┐
│ Identify deepfake detection model corresponding to the      │
│ identified subject of interest                              │
│                                                         920 │
└─────────────────────────────────────────────────────────────┘
                              │
                              ▼
┌─────────────────────────────────────────────────────────────┐
│ Extract features from data pertaining to the subject of     │
│ interest                                                    │
│                                                         930 │
└─────────────────────────────────────────────────────────────┘
                              │
                              ▼
┌─────────────────────────────────────────────────────────────┐
│ Input the extracted features to the identified deepfake     │
│ detection model corresponding to the identified subject of  │
│ interest                                                    │
│                                                         940 │
└─────────────────────────────────────────────────────────────┘
                              │
                              ▼
                     ◇ Output score of the ◇
          YES   ◇ identified deepfake detection model ◇   NO
         ◄─────◇ exceed a determined threshold?        ◇─────►
                     ◇          950           ◇

┌──────────────────────────────┐        ┌──────────────────────┐
│ Warn user of the computing   │        │ No action taken      │
│ device of a potential attack │        │                  970 │
│ with deepfake                │        └──────────────────────┘
│                          960 │
└──────────────────────────────┘
```

```
Store a plurality of deepfake detection models corresponding to a plurality of
subjects of interest
                                                                        1010
                                    ▼
Receive a query to identify whether data pertaining to a target subject of
interest is a deepfake, the target subject of interest comprised in the plurality
of subjects of interest and associated with a subject identifier (ID)
                                                                        1020
                                    ▼
Identify deepfake detection model corresponding to the subject ID
                                                                        1030
                                    ▼
Extract features for deepfake detection from the data
                                                                        1040
                                    ▼
Input the extracted features to the identified deepfake detection model
corresponding to the subject ID
                                                                        1050
                                    ▼
Responsive to an output of the deepfake detection model exceeding a
determined deepfake threshold, generate a notification, in response to the
query, indicating a possible deepfake attack corresponding to the target
subject of interest
                                                                        1060
```

*FIG. 10*

DEEPFAKE DETECTION MODELS UTILIZING SUBJECT-SPECIFIC LIBRARIES

FIELD

Embodiments relate generally to data processing and more particularly to deepfake detection models utilizing subject-specific libraries.

BACKGROUND OF THE DESCRIPTION

Neural networks and other types of machine learning models are useful tools that have demonstrated their value solving complex problems regarding pattern recognition, natural language processing, automatic speech recognition, etc. Neural networks operate using artificial neurons arranged into one or more layers that process data from an input layer to an output layer, applying weighting values to the data during the processing of the data. Such weighting values are determined during a training process and applied during an inference process.

Neural networks can be leveraged to generate synthetic content in which a subject (e.g., a person) in an existing image or video is replaced with another's likeness. Such synthetic content is often referred to as a "deepfake". The main machine learning methods used to create deepfakes are based on deep learning and involve training generative neural network architectures, such as generative adversarial networks (GANs).

With the advent of deepfakes, the development of deepfake detection techniques has also proliferated. In the current state of the art, deepfake detection techniques may operate specifically per source generators, per impersonated persons, or per specific features.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope. The figures are not to scale. In general, the same reference numbers are used throughout the drawing(s) and accompanying written description to refer to the same or like parts.

FIG. 7 is a flow diagram illustrating an embodiment of a method for training of subject-specific deepfake detection models utilizing subject-specific local libraries.

FIG. 9 is a flow diagram illustrating an embodiment of a method for inference using subject-specific deepfake detection models utilizing shared subject-specific libraries.

FIG. 10 is a flow diagram illustrating an embodiment of a method for deepfake detection models utilizing subject-specific libraries.

DETAILED DESCRIPTION

Figure 1:
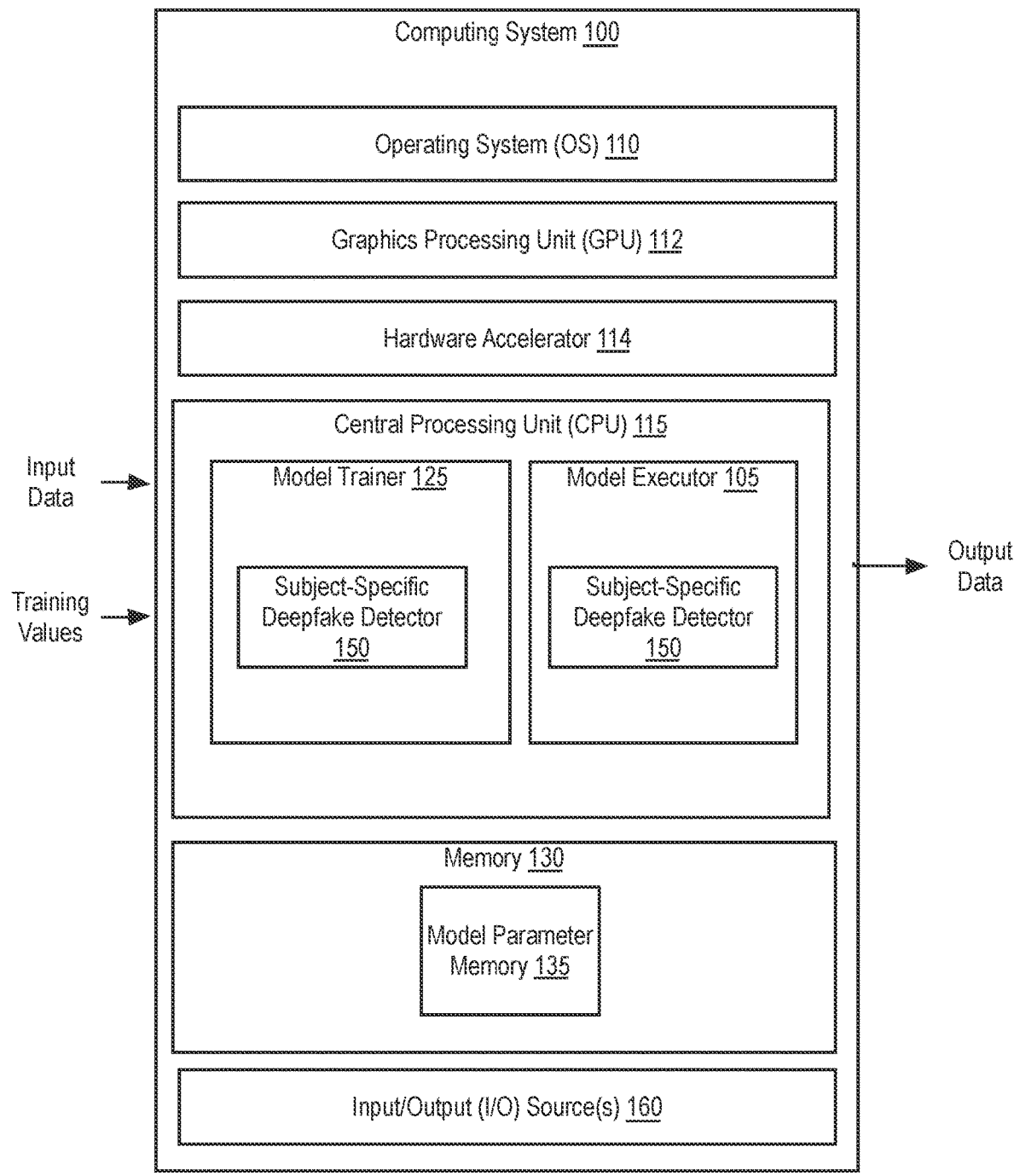
FIG. 1 is a block diagram of an example computing system that may be used to provide deepfake detection models utilizing subject-specific libraries, according to implementations of the disclosure.

Implementations of the disclosure describe deepfake detection models utilizing subject-specific libraries. In computer engineering, computing architecture is a set of rules and methods that describe the functionality, organization, and implementation of computer systems. Today's computing systems are expected to deliver near zero-wait responsiveness and superb performance while taking on large workloads for execution. Therefore, computing architectures have continually changed (e.g., improved) to accommodate demanding workloads and increased performance expectations.

Examples of large workloads include neural networks, artificial intelligence (AI), machine learning, etc. Such workloads have become more prevalent as they have been implemented in a number of computing devices, such as personal computing devices, business-related computing devices, etc. Furthermore, with the growing use of large machine learning and neural network workloads, new silicon has been produced that is targeted at running large workloads. Such new silicon includes dedicated hardware accelerators (e.g., graphics processing unit (GPU), field-programmable gate array (FPGA), vision processing unit (VPU), etc.) customized for processing data using data parallelism.

Artificial intelligence (AI), including machine learning (ML), deep learning (DL), neural networks, and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In some examples disclosed herein, a convolutional neural network is used. Using a convolutional neural network (CNN) enables classification of objects in images, natural language processing, etc. In general, machine learning models/architectures that are suitable to use in the example approaches disclosed herein may include convolutional neural networks. However, other types of machine learning models could additionally or alternatively be used such as recurrent neural network, feedforward neural network, generative adversarial network (GAN), etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Deepfakes (i.e., synthetic media that simulate a real person) can be used in malicious ways. For instance, successful phishing attacks have used deepfakes to trick office workers into money transfers. One may easily be fooled by a high-quality synthetic voice or video that resembles a specific person. It is expected that this type of attack is going to occur more frequently with improved quality of deepfakes.

With the advent of deepfakes, the development of deepfake detection techniques has also proliferated. Conventional methods for deepfake detection rely on training a classifier on a large collection of datasets. The classifier being trained aims to determine the common attributes that statistically work "well" for a group of subjects. However, there are conventional approaches do not create subject-specific models/classifiers that are trained/fine-tuned on subject-specific data, such as images, audio, and/or video data.

Deep learning models trained on a broad dataset generalize to the population, but fail to capture the signatures associated with individuals (e.g., subjects). Hence, error rates of automatic deepfake detection algorithms are high. Lower error rates could be obtained by utilizing subject-specific (also referred to herein as "person-specific") deepfake detection models. However, these subject-specific deepfake detection models should be trained on large amounts of diverse authentic audio, video or text data, which is usually available for people who have extensive public media presence. Subjects as utilized herein may refer to people or other beings or objects of interest.

To address the above-noted drawbacks, implementations of the disclosure provide for subject-specific deepfake detection models in a public or private library. Implementations describe methods for data collection for communication applications and a process to train, store, authorize, and use a resultant deepfake detection model(s). Implementations of the disclosure provide for a system that maintains a database (or library) of subject-specific deepfake detection models for many subjects. Implementations provide for at least two use cases including, but not limited to, a local library use case and a public/shared library use case. The local library of subject-specific deepfake detection models can be created and accessed for a local user of a computing device (e.g., laptop, desktop, mobile device, etc.). The local library enables automatic authenticity checking of all communications partners (e.g., communication applications) running in the background on the computing device.

The public/shared library provides for public or enterprise-wide access to the library by any user that may be subject to a deepfake simulating them, where such a user can create and upload a personalized deepfake detection model to the public/shared library. This then enables other users to verify such media associated with the first user for its authenticity. For instance, politicians may upload personalized deepfake detection models to the public/shared library of subject-specific deepfake detector models. This personalized deepfake detection model than can be accessed through the internet. In another use case, a company may create a library of personalized deepfake detection models for a group of employees (e.g., managers at a determined level or higher) that can be accessed by all employees via the public/shared library for purposes of deepfake detection.

Implementations of the disclosure provide technical advantages over the conventional approaches. Such technical advantages include techniques to personalize the deepfake detectors for individual subjects resulting in an improved accuracy of the deepfake detectors. This allows for enterprise usage as well as usage by high-profile public figures. For example, the deepfake detectors described herein could be utilized in enterprise media delivery and/or communication products.

FIG. 1 is a block diagram of an example computing system that may be used to implement deepfake detection models utilizing subject-specific libraries, according to implementations of the disclosure. The example computing system 100 may be implemented as a component of another system such as, for example, a mobile device, a wearable device, a laptop computer, a tablet, a desktop computer, a server, etc. In one embodiment, computing system 100 includes or can be integrated within (without limitation): a server-based gaming platform; a game console, including a game and media console; a mobile gaming console, a handheld game console, or an online game console. In some embodiments the computing system 100 is part of a mobile phone, smart phone, tablet computing device or mobile Internet-connected device such as a laptop with low internal storage capacity.

In some embodiments the computing system 100 is part of an Internet-of-Things (IoT) device, which are typically resource-constrained devices. IoT devices may include embedded systems, wireless sensor networks, control systems, automation (including home and building automation), and other devices and appliances (such as lighting fixtures, thermostats, home security systems and cameras, and other home appliances) that support one or more common ecosystems, and can be controlled via devices associated with that ecosystem, such as smartphones and smart speakers.

Computing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the computing system 100 includes or is part of a television or set top box device. In one embodiment, computing system 100 can include, couple with, or be integrated within a self-driving vehicle such as a bus, tractor trailer, car, motor or electric power cycle, plane or glider (or any combination thereof). The self-driving vehicle may use computing system 100 to process the environment sensed around the vehicle.

As illustrated, in one embodiment, computing system 100 may include any number and type of hardware and/or software components, such as (without limitation) graphics processing unit ("GPU", general purpose GPU (GPGPU), or simply "graphics processor") 112, a hardware accelerator 114, central processing unit ("CPU" or simply "application processor") 115, memory 130, network devices, drivers, or the like, as well as input/output (I/O) sources 160, such as touchscreens, touch panels, touch pads, virtual or regular keyboards, virtual or regular mice, ports, connectors, etc. Computing system 100 may include operating system (OS) 110 serving as an interface between hardware and/or physical resources of the computing system 100 and a user. In some implementations, the computing system 100 may include a combination of one or more of the CPU 115, GPU 112, and/or hardware accelerator 114 on a single system on a chip (SoC), or may be without a GPU 112 or visual output (e.g., hardware accelerator 114) in some cases, etc.

As used herein, "hardware accelerator", such as hardware accelerator 114, refers to a hardware device structured to provide for efficient processing. In particular, a hardware accelerator may be utilized to provide for offloading of some processing tasks from a central processing unit (CPU) or other general processor, wherein the hardware accelerator may be intended to provide more efficient processing of the processing tasks than software run on the CPU or other processor. A hardware accelerator may include, but is not limited to, a graphics processing unit (GPU), a vision processing unit (VPU), neural processing unit, AI (Artificial Intelligence) processor, field programmable gate array (FPGA), or application-specific integrated circuit (ASIC).

The GPU 112 (or graphics processor 112), hardware accelerator 114, and/or CPU 115 (or application processor 115) of example computing system 100 may include a model trainer 125 and model executor 105. Although the model trainer 125 and model executor 105 are depicted as part of the CPU 115, in some implementations, the GPU 112 and/or hardware accelerator 114 may include the model trainer 125 and model executor 105.

The example model executor 105 accesses input values (e.g., via an input interface (not shown)), and processes those input values based on a machine learning model stored in a model parameter memory 135 of the memory 130 to produce output values (e.g., via an output interface (not shown)). The input data may be received from one or more data sources (e.g., via one or more sensors, via a network interface, etc.). However, the input data may be received in any fashion such as, for example, from an external device (e.g., via a wired and/or wireless communication channel). In some examples, multiple different types of inputs may be received. In some examples, the input data and/or output data is received via inputs and/or outputs of the system of which the computing system 100 is a component.

In the illustrated example of FIG. 1, the example neural network parameters stored in the model parameter memory 135 are trained by the model trainer 125 such that input training data (e.g., received via a training value interface (not shown)) results in output values based on the training data. In the illustrated example of FIG. 1, the model trainer 125 can train a subject-specific deepfake detector 150 to generate a deepfake detection models utilizing subject-specific libraries that is utilized when processing the model during training and/or inference. In implementations of the disclosure, the subject-specific deepfake detector 150 is to be used for identification of subject-specific deepfake content that is provided to the model.

The example model executor 105, the example model trainer 125, and/or the example subject-specific deepfake detector 150 are implemented by one or more logic circuits such as, for example, hardware processors. In some examples, one or more of the example model executor 105, the example model trainer 125, and/or the example subject-specific deepfake detector 150 may be implemented by a same hardware component (e.g., a same logic circuit) or by different hardware components (e.g., different logic circuits, different computing systems, etc.). However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In examples disclosed herein, the example model executor 105 executes a machine learning model. The example machine learning model may be implemented using a neural network (e.g., a feedforward neural network). However, any other past, present, and/or future machine learning topology(ies) and/or architecture(s) may additionally or alternatively be used such as, for example, a CNN.

To execute a model, the example model executor 105 accesses input data. The example model executor 105 applies the model (defined by the model parameters (e.g., neural network parameters including weight and/or activations) stored in the model parameter memory 135) to the input data.

The example model parameter memory 135 of the illustrated example of FIG. 1 is implemented by any memory, storage device and/or storage disc for storing data such as, for example, flash memory, magnetic media, optical media, etc. Furthermore, the data stored in the example model parameter memory 135 may be in any data format such as, for example, binary data, comma delimited data, tab delimited data, structured query language (SQL) structures, etc. While in the illustrated example the model parameter memory 135 is illustrated as a single element, the model parameter memory 135 and/or any other data storage elements described herein may be implemented by any number and/or type(s) of memories. In the illustrated example of FIG. 1, the example model parameter memory 135 stores model weighting parameters that are used by the model executor 105 to process inputs for generation of one or more outputs as output data.

In examples disclosed herein, the output data may be information that classifies the received input data (e.g., as determined by the model executor 105.). However, any other type of output that may be used for any other purpose may additionally or alternatively be used. In examples disclosed herein, the output data may be output by an input/output (I/O) source 160 that displays the output values. However, in some examples, the output data may be provided as output values to another system (e.g., another circuit, an external system, a program executed by the computing system 100, etc.). In some examples, the output data may be stored in a memory.

The example model trainer 125 of the illustrated example of FIG. 1 compares expected outputs (e.g., received as training values at the computing system 100) to outputs produced by the example model executor 105 to determine an amount of training error, and updates the model parameters (e.g., model parameter memory 135) based on the amount of error. After a training iteration, the amount of error is evaluated by the model trainer 125 to determine whether to continue training. In examples disclosed herein, errors are identified when the input data does not result in an expected output. That is, error is represented as a number of incorrect outputs given inputs with expected outputs. However, any other approach to representing error may additionally or alternatively be used such as, for example, a percentage of input data points that resulted in an error.

The example model trainer 125 determines whether the training error is less than a training error threshold. If the training error is less than the training error threshold, then the model has been trained such that it results in a sufficiently low amount of error, and no further training is pursued. In examples disclosed herein, the training error threshold is ten errors. However, any other threshold may additionally or alternatively be used. Moreover, other types of factors may be considered when determining whether model training is complete. For example, an amount of training iterations performed and/or an amount of time elapsed during the training process may be considered.

The training data that is utilized by the model trainer 125 includes example inputs (corresponding to the input data expected to be received), as well as expected output data. In examples disclosed herein, the example training data is provided to the model trainer 125 to enable the model trainer 125 to determine an amount of training error.

In examples disclosed herein, the example model trainer 125 utilizes the subject-specific deepfake detector 150 to implement deepfake detection models utilizing subject-specific libraries. In implementations of the disclosure, the deepfake detection models utilizing subject-specific libraries can include providing for subject-specific deepfake detection models in a public or private library. In one implementation, the subject-specific deepfake detector 150 of the example model trainer 125 and/or the example model executor 105 can be used to provide for a system that maintains a database, or library, of person-specific deepfake detection models for many subjects. In one implementation, the subject-specific deepfake detector 150 of FIG. 1 can be used in combination with data collection by desired applications and can implement a process to train, store, authorize, and use the resultant subject-specific deepfake detection models.

As previously noted, implementations of the disclosure provide for at least two use cases including a local library use case and a public/shared library use case. The local library of subject-specific deepfake detection models can be created (as subject-specific deepfake detector 150) and accessed for a local user of a computing device (e.g., laptop, etc.). The local library enables automatic authenticity checking of all communications partners in the background on the computing device. The public/shared library provides for public or enterprise-wide access to the library by any user that may be subject to deepfake simulating them to create and upload a personalized deepfake detection model (e.g., as subject-specific deepfake detector 150) to the public/shared library. This then enables other users to verify such media for its authenticity.

As discussed above, to train a model, such as a machine learning model utilizing a neural network, the example model trainer 125 trains a machine learning model as the subject-specific deepfake detector 150. Further discussion and detailed description of the model trainer 125, the model executor 105, and the subject-specific deepfake detector 150, are provided below with respect to FIGS. 2-11.

The example I/O source 160 of the illustrated example of FIG. 1 enables communication of the model stored in the model parameter memory 135 with other computing systems. In some implementations, the I/O source(s) 160 may include, at but is not limited to, a network device, a microprocessor, a camera, a robotic eye, a speaker, a sensor, a display screen, a media player, a mouse, a touch-sensitive device, and so on. In this manner, a central computing system (e.g., a server computer system) can perform training of the model and distribute the model to edge devices for utilization (e.g., for performing inference operations using the model). In examples disclosed herein, the I/O source 160 is implemented using an Ethernet network communicator. However, any other past, present, and/or future type(s) of communication technologies may additionally or alternatively be used to communicate a model to a separate computing system.

While an example manner of implementing the computing system 100 is illustrated in FIG. 1, one or more of the elements, processes and/or devices illustrated in FIG. 1 may be combined, divided, re-arranged, omitted, eliminated and/or implemented in any other way. Further, the example model executor 105, the example model trainer 125, the example subject-specific deepfake detector 150, the I/O source(s) 160, and/or, more generally, the example computing system 100 of FIG. 1 may be implemented by hardware, software, firmware and/or any combination of hardware, software and/or firmware. Thus, for example, any of the example model executor 105, the example model trainer 125 the example subject-specific deepfake detector 150, the example I/O source(s) 160, and/or, more generally, the example computing system 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In some implementations of the disclosure, a software and/or firmware implementation of at least one of the example model executor 105, the example model trainer 125, the example subject-specific deepfake detector 150, the example I/O source(s) 160, and/or, more generally, the example computing system 100 of FIG. 1 be provided. Such implementations can include a non-transitory computer readable storage device or storage disk (also referred to herein as a non-transitory computer-readable storage medium) such as a memory, a digital versatile disk (DVD), a compact disk (CD), a Blu-ray disk, etc. including the software and/or firmware. Further still, the example computing system 100 of FIG. 1 may include one or more elements, processes and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not utilize direct physical (e.g., wired) communication and/or constant communication, but rather additionally includes selective communication at periodic intervals, scheduled intervals, aperiodic intervals, and/or one-time events.

Machine Learning Overview

A machine learning algorithm is an algorithm that can learn based on a set of data. Embodiments of machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech and/or speech recognition.

An example type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 2:
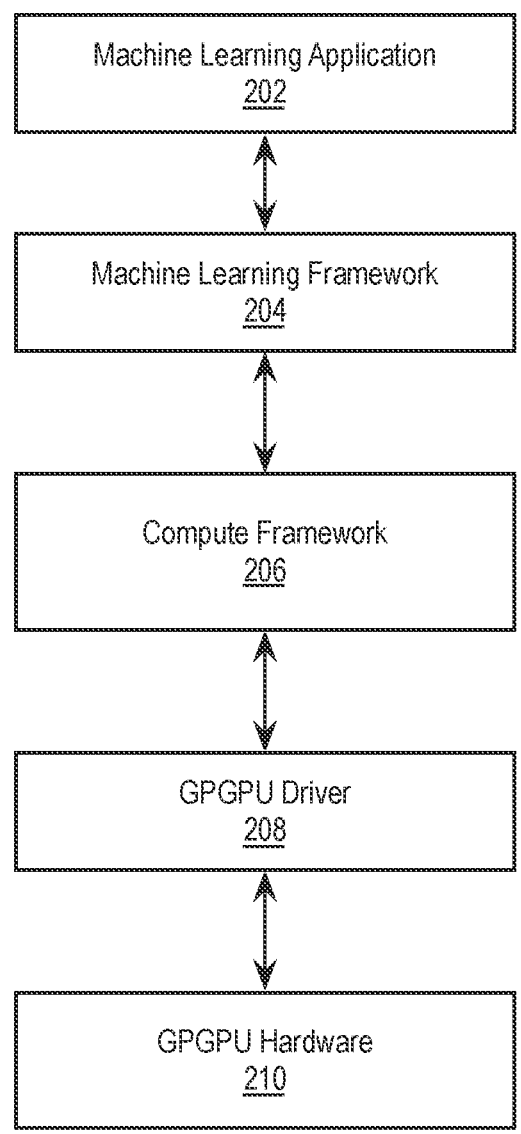
FIG. 2 illustrates a machine learning software stack, according to an embodiment.

FIG. 2 is a generalized diagram of a machine learning software stack 200. A machine learning application 202 can be configured to train a neural network using a training dataset or to use a trained deep neural network to implement machine intelligence. The machine learning application 202 can include training and inference functionality for a neural network and/or specialized software that can be used to train a neural network before deployment. The machine learning application 202 can implement any type of machine intelligence including but not limited to image recognition, mapping and localization, autonomous navigation, speech synthesis, medical imaging, or language translation.

Hardware acceleration for the machine learning application 202 can be enabled via a machine learning framework 204. The machine learning framework 204 can provide a library of machine learning primitives. Machine learning primitives are basic operations that are commonly performed by machine learning algorithms. Without the machine learning framework 204, developers of machine learning algorithms would have to create and optimize the main computational logic associated with the machine learning algorithm, then re-optimize the computational logic as new parallel processors are developed. Instead, the machine learning application can be configured to perform the computations using the primitives provided by the machine learning framework 204. Example primitives include tensor convolutions, activation functions, and pooling, which are computational operations that are performed while training a convolutional neural network (CNN). The machine learning framework 204 can also provide primitives to implement basic linear algebra subprograms performed by many machine-learning algorithms, such as matrix and vector operations.

The machine learning framework 204 can process input data received from the machine learning application 202 and generate the appropriate input to a compute framework 206. The compute framework 206 can abstract the underlying instructions provided to the GPGPU driver 208 to enable the machine learning framework 204 to take advantage of hardware acceleration via the GPGPU hardware 210 without requiring the machine learning framework 204 to have intimate knowledge of the architecture of the GPGPU hardware 210. Additionally, the compute framework 206 can enable hardware acceleration for the machine learning framework 204 across a variety of types and generations of the GPGPU hardware 210.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One example type of neural network is the feedforward network, as previously described.

A second example type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for an RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present example feedforward, CNN, and RNN networks, as well as describe a general process for respectively training and deploying each of those types of networks. It can be understood that these descriptions are example and non-limiting as to any specific embodiment described herein and the concepts illustrated can be applied generally to deep neural networks and machine learning techniques in general.

The example neural networks described above can be used to perform deep learning. Deep learning is machine learning using deep neural networks. The deep neural networks used in deep learning are artificial neural networks composed of multiple hidden layers, as opposed to shallow neural networks that include a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models can be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the sought-after output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 3A:
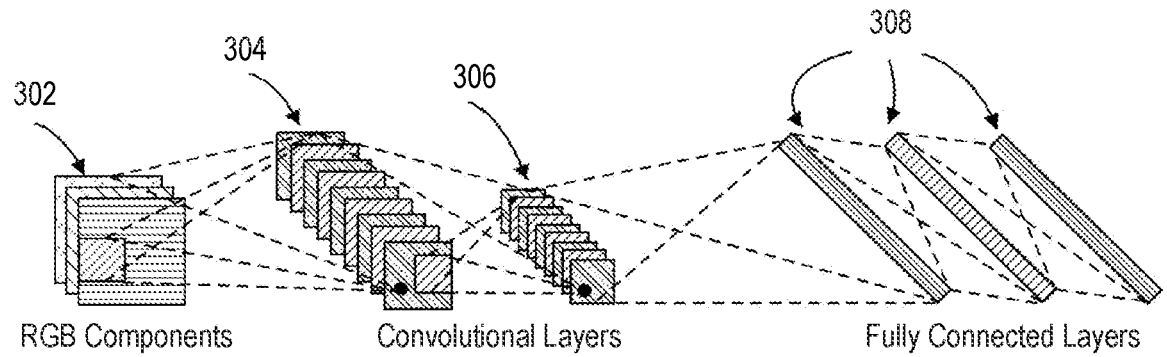
FIGS. 3A-3B illustrate layers of example deep neural networks.
Figure 3B:
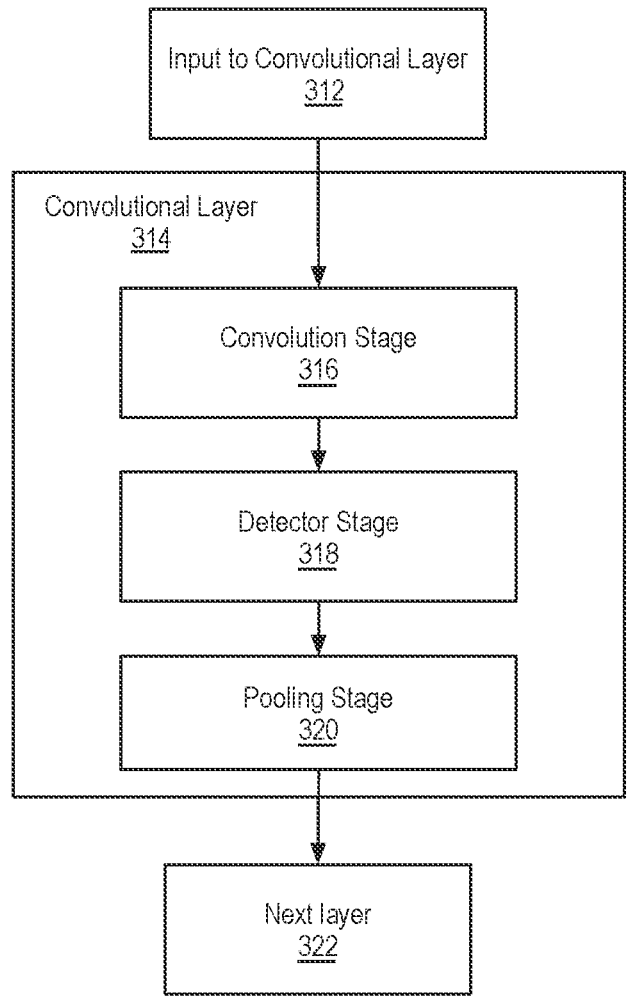

FIGS. 3A-3B illustrate an example convolutional neural network. FIG. 3A illustrates various layers within a CNN. As shown in FIG. 3A, an example CNN used to model image processing can receive input 302 describing the red, green, and blue (RGB) components of an input image. The input 302 can be processed by multiple convolutional layers (e.g., first convolutional layer 304, second convolutional layer 306). The output from the multiple convolutional layers may optionally be processed by a set of fully connected layers 308. Neurons in a fully connected layer have full connections to all activations in the previous layer, as previously described for a feedforward network. The output from the fully connected layers 308 can be used to generate an output result from the network. The activations within the fully connected layers 308 can be computed using matrix multiplication instead of convolution. Not all CNN implementations make use of fully connected layers 308. For example, in some implementations the second convolutional layer 306 can generate output for the CNN.

The convolutional layers are sparsely connected, which differs from traditional neural network configuration found in the fully connected layers 308. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 3B illustrates example computation stages within a convolutional layer of a CNN. Input to a convolutional layer 312 of a CNN can be processed in three stages of a convolutional layer 314. The three stages can include a convolution stage 316, a detector stage 318, and a pooling stage 320. The convolutional layer 314 can then output data to a successive convolutional layer. The final convolutional layer of the network can generate output feature map data or provide input to a fully connected layer, for example, to generate a classification value for the input to the CNN.

In the convolution stage 316 performs several convolutions in parallel to produce a set of linear activations. The convolution stage 316 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 316 defines a set of linear activations that are processed by successive stages of the convolutional layer 314.

The linear activations can be processed by a detector stage 318. In the detector stage 318, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0, x)$, such that the activation is thresholded at zero.

The pooling stage 320 uses a pooling function that replaces the output of the second convolutional layer 306 with a summary statistic of the nearby outputs. The pooling function can be used to introduce translation invariance into the neural network, such that small translations to the input do not change the pooled outputs. Invariance to local translation can be useful in scenarios where the presence of a feature in the input data is weighted more heavily than the precise location of the feature. Various types of pooling functions can be used during the pooling stage 320, including max pooling, average pooling, and 12-norm pooling. Additionally, some CNN implementations do not include a pooling stage. Instead, such implementations substitute and additional convolution stage having an increased stride relative to previous convolution stages.

The output from the convolutional layer 314 can then be processed by the next layer 322. The next layer 322 can be an additional convolutional layer or one of the fully connected layers 308. For example, the first convolutional layer 304 of FIG. 3A can output to the second convolutional layer 306, while the second convolutional layer can output to a first layer of the fully connected layers 308.

Figure 4:
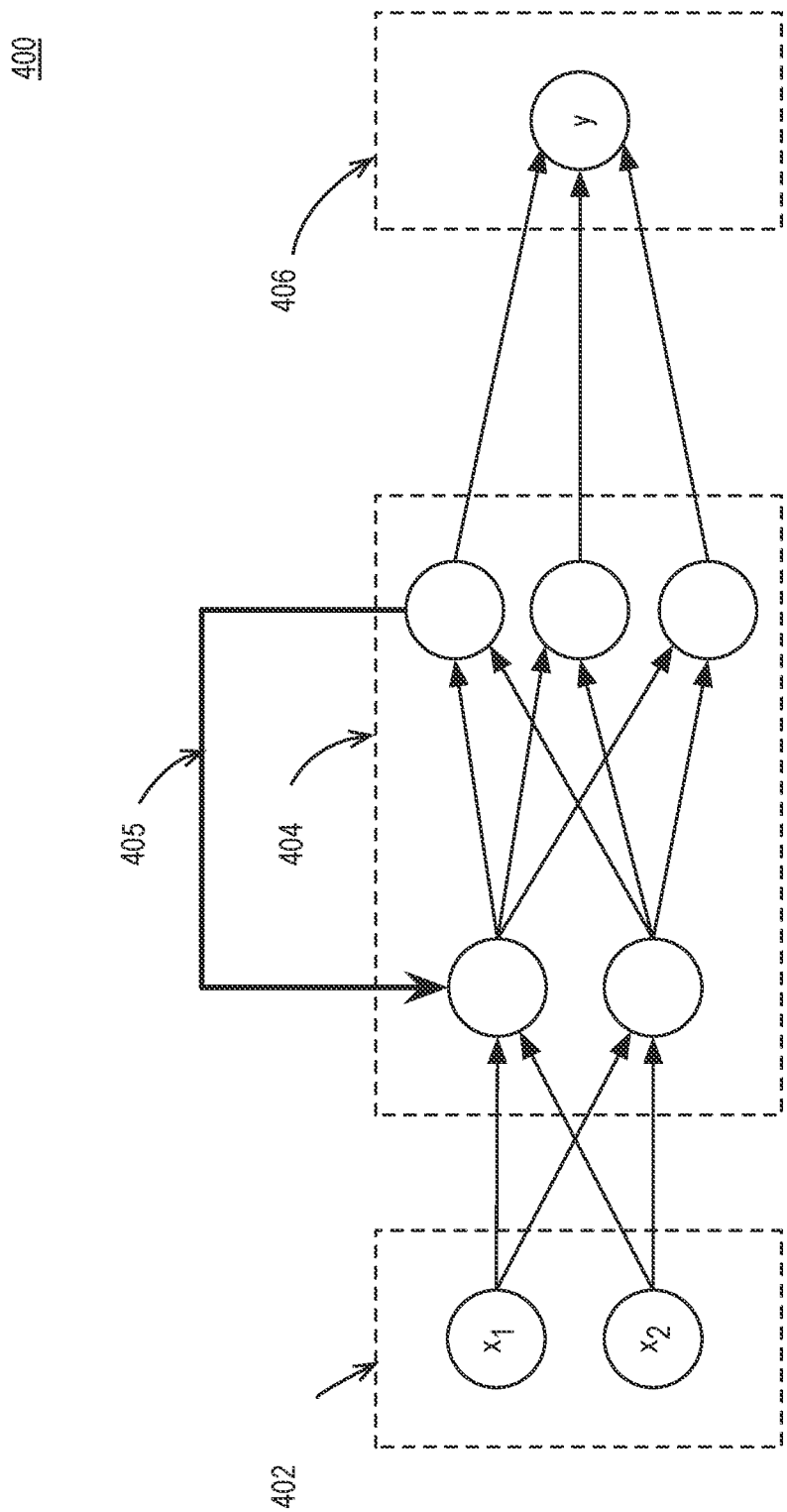
FIG. 4 illustrates an example recurrent neural network.

FIG. 4 illustrates an example recurrent neural network. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 400 can be described as having an input layer 402 that receives an input vector, hidden layers 404 to implement a recurrent function, a feedback mechanism 405 to enable a 'memory' of previous states, and an output layer 406 to output a result. The RNN 400 operates based on time-steps. The state of the RNN at a given time step is influenced based on the previous time step via the feedback mechanism 405. For a given time step, the state of the hidden layers 404 is defined by the previous state and the input at the current time step. An initial input ($x_1$) at a first time step can be processed by the hidden layer 404. A second input ($x_2$) can be processed by the hidden layer 404 using state information that is determined during the processing of the initial input ($x_1$). A given state can be computed as $s_t = f(Ux_t + Ws_{t-1})$, where U and W are parameter matrices. The function $f$ is generally a nonlinearity, such as the hyperbolic tangent function (Tanh) or a variant of the rectifier function $f(x) = \max(0, x)$. However, the specific mathematical function used in the hidden layers 404 can vary depending on the specific implementation details of the RNN 400.

In addition to the basic CNN and RNN networks described, variations on those networks may be enabled. One example RNN variant is the long short-term memory (LSTM) RNN. LSTM RNNs are capable of learning long-term dependencies that may be utilized for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimized initial set of weights for the neural network.

Figure 5:
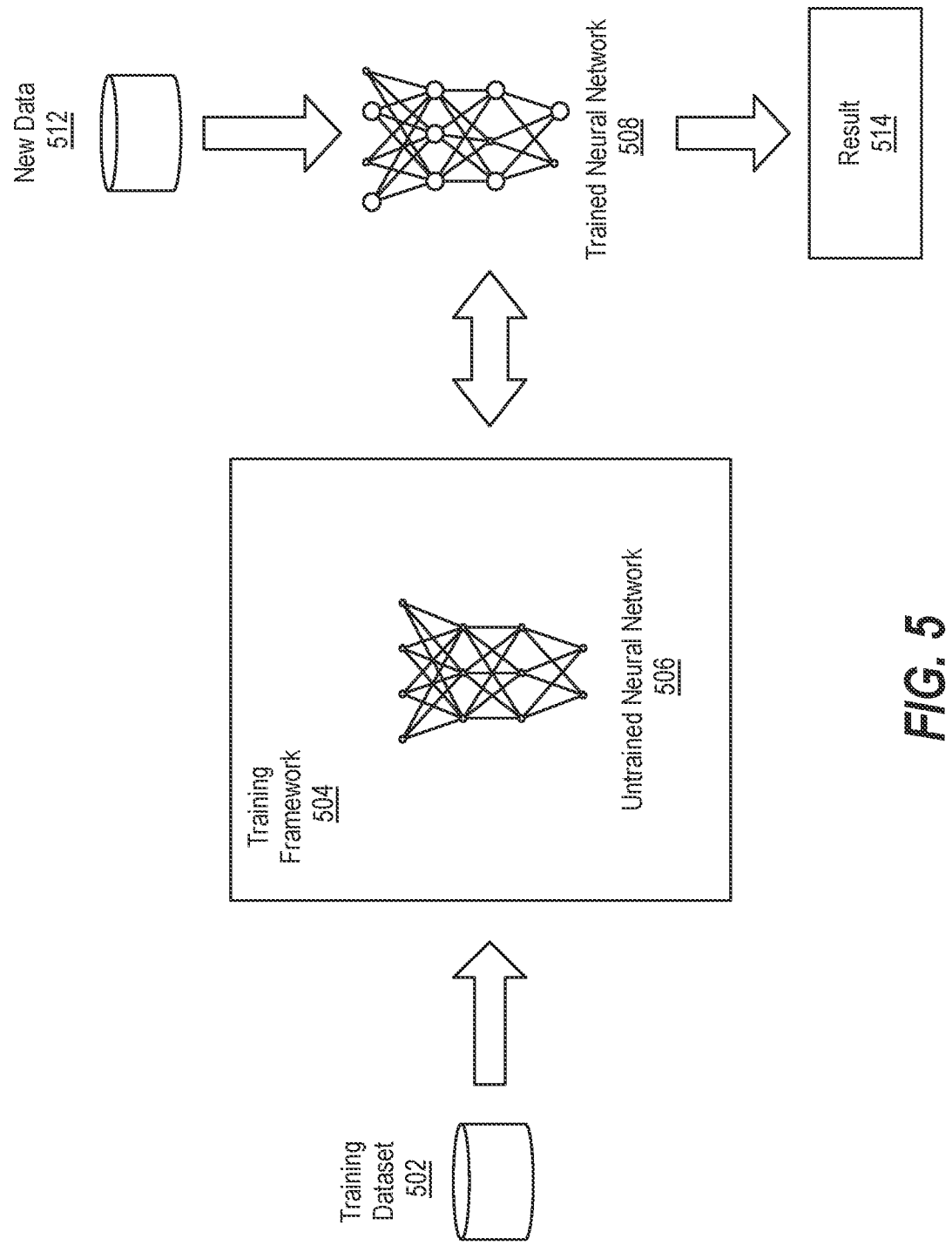
FIG. 5 illustrates training and deployment of a deep neural network.

FIG. 5 illustrates training and deployment of a deep neural network. Once a given network has been structured for a task the neural network is trained using a training dataset 502. Various training frameworks have been developed to enable hardware acceleration of the training process. For example, the machine learning framework 204 of FIG. 2 may be configured as a training framework 504. The training framework 504 can hook into an untrained neural network 506 and enable the untrained neural network to be trained using the parallel processing resources described herein to generate a trained neural network 508. To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 502 includes input paired with the sought-after output for the input, or where the training dataset includes input having known output and the output of the neural network is manually graded. The network processes the inputs and compares the resulting outputs against a set of expected or sought-after outputs. Errors are then propagated back through the system. The training framework 504 can adjust to adjust the weights that control the untrained neural network 506. The training framework 504 can provide tools to monitor how well the untrained neural network 506 is converging towards a model suitable to generating correct answers based on known input data. The training process occurs repeatedly as the weights of the network are adjusted to refine the output generated by the neural network. The training process can continue until the neural network reaches a statistically relevant accuracy associated with a trained neural network 508. The trained neural network 508 can then be deployed to implement any number of machine learning operations to generate an inference result 514 based on input of new data 512.

Unsupervised learning is a learning method in which the network attempts to train itself using unlabeled data. Thus, for unsupervised learning the training dataset 502 can include input data without any associated output data. The untrained neural network 506 can learn groupings within the unlabeled input and can determine how individual inputs are related to the overall dataset. Unsupervised training can be used to generate a self-organizing map, which is a type of trained neural network 508 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 502 includes a mix of labeled and unlabeled data of the same distribution. Incremental learning is a variant of supervised learning in which input data is continuously used to further train the model. Incremental learning enables the trained neural network 508 to adapt to the new data 512 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

Example Machine Learning Applications

Machine learning can be applied to solve a variety of technological problems, including but not limited to computer vision, autonomous driving and navigation, speech recognition, and language processing. Computer vision has traditionally been an active research areas for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes a probable linguistic sequence given an input acoustic sequence. Accelerated machine learning using deep neural networks have enabled the replacement of the hidden Markov models (HMMs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Example natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training, while deployed machine learning (e.g., inferencing) platforms generally include lower power parallel processors suitable for use in products such as cameras, autonomous robots, and autonomous vehicles.

Deepfake Detection Models Utilizing Subject-Specific Libraries

As discussed above, implementations of the disclosure provide for deepfake detection models utilizing subject-specific libraries. As previously discussed, neural networks can be leveraged to generate synthetic content in which a person in an existing image or video is replaced with someone else's likeness. Such synthetic content is often referred to as a "deepfake".

Deepfakes (i.e., synthetic media that simulate a real person) can be used in malicious ways. For instance, successful phishing attacks have used deepfakes to trick office workers into money transfers. One may easily be fooled by a high-quality synthetic voice or video that resembles a specific person. It is expected that this type of attack is going to occur more frequently with improved quality of deepfakes.

With the advent of deepfakes, the development of deepfake detection techniques has also proliferated. Conventional methods for deepfake detection rely on training a classifier on a large collection of datasets. The classifier being trained aims to determine the common attributes that statistically work "well" for a group of subjects. However, there are conventional approaches do not create subject-specific models/classifiers that are trained/fine-tuned on subject-specific data, such as images, audio, and/or video data.

Deep learning models trained on a broad dataset generalize to the population but fail to capture the signatures associated with individuals (e.g., subjects). Hence, error rates of automatic deepfake detection algorithms are high. Lower error rates could be obtained by utilizing subject-specific (also referred to herein as "person-specific") deepfake detection models. However, these subject-specific deepfake detection models should be trained on large amounts of diverse authentic audio, video or text data, which is usually available for people who have extensive public media presence.

To address the above-noted drawbacks, implementations of the disclosure provide for subject-specific deepfake detection models in a public or private library. Implementations describe methods for data collection for desired applications and the process to train, store, authorize, and use the resultant deepfake detection models. Implementations of the disclosure provide for a system that maintains a database, or library, of person-specific deepfake detection models for many subjects. Implementations provide for at least two use cases including a local library use case and a public/shared library use case. The local library of subject-specific deepfake detection models can be created and accessed for a local user of a computing device (e.g., laptop, etc.). The local library enables automatic authenticity checking of all communications partners in the background on the computing device.

The public/shared library provides for public or enterprise-wide access to the library by any user that may be subject to deepfake simulating them to create and upload a personalized deepfake detection model to the public/shared library. This then enables other users to verify such media for its authenticity. For instance, politicians may upload personalized deepfake detection models to the public/shared library of subject-specific deepfake detector models. This personalized deepfake detection model than can be accessed through the internet. In another use case, a company may create a library of personalized deepfake detection models for all top-level managers that can be accessed by all employees via the public/shared library for purposes of deepfake detection.

In one implementation, the subject-specific deepfake detector 150 of the example model trainer 125 and/or the example model executor 105 described with respect to FIG. 1 provides for the subject-specific deepfake detection models in a public or private library, as described herein. The following description and figures detail such an implementation.

Figure 6:
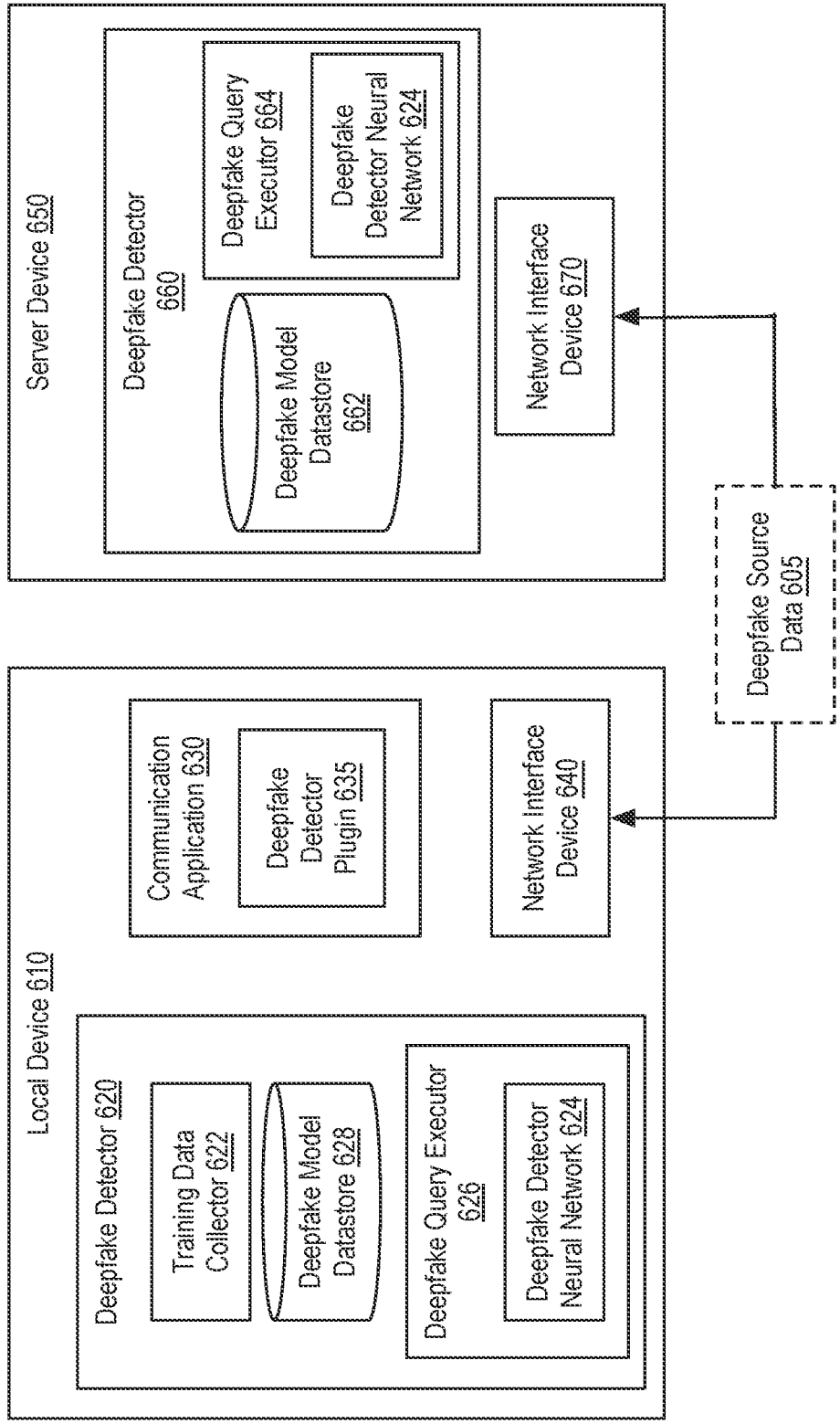
FIG. 6 depicts a block diagram of a deepfake system implementing deepfake detection models utilizing subject-specific libraries, in accordance with implementations of the disclosure.

FIG. 6 depicts a block diagram of a deepfake system 600 implementing deepfake detection models utilizing subject-specific libraries, in accordance with implementations of the disclosure. In one embodiment, FIG. 6 depicts a deepfake system 600 including at local device (i.e., computing device or local computing device) 610 and a server device (i.e., computing device or public computing device) 650 configured for subject-specific deepfake detection, in accordance with implementations of the disclosure.

In one embodiment, local device 610 and/or server device 650 may be computing device comprises a set of hardware, software, firmware elements and/or any combination of hardware, software and/or firmware elements. In some embodiments, deepfake detector 620 may be implemented in the same computing device. For example, local device 610 and/or server device 650 may include hardware circuitry, such as one or more of a CPU, a GPU, a hardware accelerator, and so on to execute one or more processes on local device 610 and/or server device 650, as described herein.

In some embodiments, local device includes a deepfake detector 620 and server device 650 include a deepfake detector 660. In one embodiment, deepfake detectors 620, 660 can be implemented in separate computing devices and are communicably coupled via a network (not shown). Deepfake detectors 620, 660 may be implemented using hardware circuitry, such as one or more of a CPU, a GPU, a hardware accelerator, and so on. In one embodiment, deepfake detectors 620, 660 may be implemented using computing system 100 described with respect to FIG. 1. In one implementation, deepfake detectors 620, 660 are the same as deepfake detector 150 described with respect to FIG. 1.

More generally, the example deepfake system 600 of FIG. 6 may be implemented by hardware, software, firmware and/or any combination of hardware, software and/or firmware. Thus, for example, the example deepfake detector 620, 660 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

As noted above, deep learning models trained on a broad dataset generalize to the population, but fail to capture the signatures associated with individuals (e.g., subjects). Implementations of the disclosure provide for subject-specific deepfake detection models in a public and/or private library. Depending on the application scenario, "person-specific data" may comprise images, video, audio recordings, texts written by a person, as well as activity patterns and/or mannerisms, to name a few examples. Implementations describe methods for data collection for desired applications and the process to train, store, authorize, and use the resultant deepfake detection models. Implementations of the disclosure provide for a system that maintains a database, or library, of person-specific deepfake detection models for many subjects. Implementations provide for at least two use cases including a local library use case and a public/shared library use case.

With respect to the local library use case, local device 610 includes deepfake detector 620 communicably coupled to at least one communication application 630 and a network interface device 640. A local library of subject-specific deepfake detection models, shown as deepfake model datastore 628, can be created and accessed for a local user of local device 610. The local library (e.g., deepfake model datastore 628) enables automatic authenticity checking, by deepfake query executor 626, of all communications partners in the background on the computing device using a trained deepfake detector neural network 624.

With respect to the public/shared library use case, server device 650 includes deepfake detector 660 communicably coupled to a network interface device 670 to provide for public or enterprise-wide access to a library, shown as deepfake model datastore 662, by any user that may be subject to a deepfake simulating them. Such a user can create and upload a personalized deepfake detection model to the public/shared library (e.g., deepfake model datastore 662). This then enables other users to verify such media for its authenticity by submitting deepfake queries (e.g., deepfake source data 605) to the server device 650 and the deepfake query executor 664 using the trained deepfake detector neural network 624 to verify authenticity of the data provided in the deepfake query. In one implementation, the deepfake detector neural network 624 may include at least one of a distribution model, classifier, or generative model, for example. For instance, politicians may upload personalized deepfake detection models to the public/shared library of subject-specific deepfake detector models. This personalized deepfake detection model then can be accessed through the internet. In another use case, a company may create a library of personalized deepfake detection models for all top-level managers that can be accessed by all employees via the public/shared library for purposes of deepfake detection.

For the local library use case, the data may be collected continuously using a communication application 630 that runs in the background on the local device 610. The communication application 630 may interface with network interface device 640 to enable the communications. Using a deepfake detector plugin 635 to the communication application 630, training data collector 622 captures data (e.g., video, audio, text) corresponding to the communication together with an identification (ID) of the subject that generated the data (e.g., a caller ID).

In one embodiment, the captured data is leveraged by training data collector 622 to incrementally build local, subject-specific deepfake detection models (stored in deepfake model datastore 628) of one or more subjects that the user of the local device 610 communicates with. In one example, voice conversion techniques may utilize five minutes of speech of a target subject to create a high-quality deepfake of the person's voice. As such, deepfake detector 620 can leverage such a locally-created deepfake) to fine-tune a classifier that distinguishes the synthetic data from the authentic data of that subject.

In some embodiments, the deepfake detection models for different subject may share some or almost all parameters. Privacy of subjects may be protected in embodiments herein as the data being utilized is used for updating (training) of the detection models and is not stored. Furthermore, it is not possible to reconstruct the communication data from the subject-specific deepfake model. Furthermore, the model could be stored in an encrypted format to prevent modification.

For the public/shared use case, the data containing a specific subject (e.g., images, video, audio samples of the person's voice) or having been created by a specific subject like text samples written by the person can be collected in a supervised fashion. For instance, the training data may be collected for purposes of creating a deepfake detection model for the subject. As the data does not have to be published, private and personal recordings can be included. There are a number of different techniques that can be applied to create the subject-specific deepfake detection model based on that data. For example, one technique can create deepfakes from different samples of the authentic data and using them to train a classifier that distinguishes the synthetic data from the authentic data of the subject. Another technique is to create an anomaly detection system based on the authentic samples, e.g., using a distribution model (e.g., novelty detection with one-class SVM), a classifier, or a generative model (autoencoder).

Depending on the local or public/shared use cases discussed above, the subject-specific deepfake detector model is stored in a local library (e.g., deepfake model datastore 628) on the local device 610, stored in a shared library (e.g., deepfake model datastore 662) on a server device 650 (e.g., enterprise server), or uploaded to the cloud. In some embodiments, the subject-specific deepfake model may be stored in encrypted format. A publicly-accessible library of deepfake detector models, such as deepfake model datastore 662 on server device 650 may authenticate an uploader of a model to verify that the uploader has the permission of the subject that the model is specialized for. In one embodiment, the data could be watermarked or crypto-based meta-data tagged for utilization in the subject's training model. The deepfake detector 660 may further request uploading of a small set of recordings of that subject together with the model to verify that the subject-specific deepfake detection model is indeed specialized for the subject that the model is attributed to.

In detection mode, the deepfake system 600 implements deepfake detectors 620, 660 to run the deepfake detection model for the respective subject and warn of a potential deepfake if an estimated probability for the provided data (e.g., face, voice, text being simulated) (e.g., deepfake source data 605) exceeds a predetermined threshold. The deepfake detection may be performed by a deepfake query executor 626, 664 of the deepfake detector 620, 660 based on a combination of features including, but not limited to subject-specific characteristics. Depending on the application scenario, the system may run the deepfake detection automatically in the background, for instance during a call when the ID of the subject is known. In other application scenarios, the user may explicitly trigger the detection mode, e.g., by clicking a button next to a video.

In the case of the pubic/shared deepfake detection, in order not to expose the personalized deepfake detection model stored in deepfake model datastore 662, the model can be "hidden" behind a trusted deepfake detection service (Such as deepfake detector 660), which retrieves media and returns the outcome of the detection. To prevent abuse of the service, the service may limit the frequency of requests per user.

A sample application for the local device 610 use case may include implementing an add-on (e.g., deepfake detector plugin 635) for a voice-over-IP (VOIP) software application (e.g., communication application 630) that automatically captures audio data from VOIP communication calls together with an ID of the caller (e.g., caller ID). The deepfake detector 620 leverages this data to extract features from the audio stream and train a deepfake detector model, which may, for instance, include an ensemble of different models: a speaker verification model, a subject-specific deepfake detector model, and a general-purpose deepfake detector model. In one embodiment, the speaker verification model can be trained using x-vectors. The subject-specific deepfake detector model can be trained by creating synthetic voices using voice conversion methods from different samples of the collected speaker data and using them to train a classifier that distinguishes the synthetic voices from the real voice of that person. The general-purpose deepfake detector model can be generated in advance leveraging audio data from multiple different synthetic and real voices.

During inference, whenever a VOIP communication call happens, the detection system (e.g., deepfake query executor 626) is run on the captured audio data (e.g., deepfake source data 605) and the probability for a fake caller is estimated using the trained and locally-stored subject-specific detector model, leveraging the caller ID. If the probability exceeds a predefined threshold a warning can be shown to the user.

A sample application for public/shared use case may include utilizing, for example, an add-on for web browsers on a user device. If a media file or stream (e.g., deepfake source data 605) has been labeled to contain a specific subject (e.g., person), the add-on can communicate in the background with a public deepfake detection service (e.g., deepfake detector 660 of server device 650) to determine whether the media file or stream includes a deepfake detection model (e.g., in deepfake model datastore 662) for that person. If such a deepfake detection model exists, the media recording is sent to the service (e.g., as deepfake source data 605) and a warning or other notification can be displayed next to the media file or stream depending on the result returned by the deepfake detection service (e.g., deepfake query executor 664 using the subject-specific deepfake model represented as deepfake detector neural network 624).

In enterprises, there could be a use case for creating voice models of employees/executives. These models remain secure with the employer and may be invoked during audio meetings (e.g., conference, earnings calls, or all phone calls). This could prevent "boss calling" attacks for financial fraud. This could be used as a method to verify identity, validate information from social media among social groups, and so on.

FIG. 7 is a flow diagram illustrating an embodiment of a method 700 for training of subject-specific deepfake detection models utilizing subject-specific local libraries. Method 700 may be performed by processing logic that may comprise hardware (e.g., circuitry, dedicated logic, programmable logic, etc.), software (such as instructions run on a processing device), or a combination thereof. More particularly, the method 700 may be implemented in one or more modules as a set of logic instructions stored in a machine- or computer-readable storage medium (also referred to herein as a non-transitory computer-readable storage medium) such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 700 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-6 may not be repeated or discussed hereafter. In one implementation, a processing device implementing a deepfake system 600 of FIG. 6 may perform method 700.

The example process of method 700 of FIG. 7 begins at block 710 where the processing device may collect communication data corresponding to an identifier (ID) of a subject communicating with a computing device. Then, at block 720, the processing device may extract one of more features from the collected communication data for utilization in deepfake detection.

Subsequently, at block 730, the processing device may train a subject-specific deepfake detection model for the subject. Lastly, at block 740, the processing device may store the ID of the subject and the subject-specific deepfake detection model at the computing device.

Figure 8:
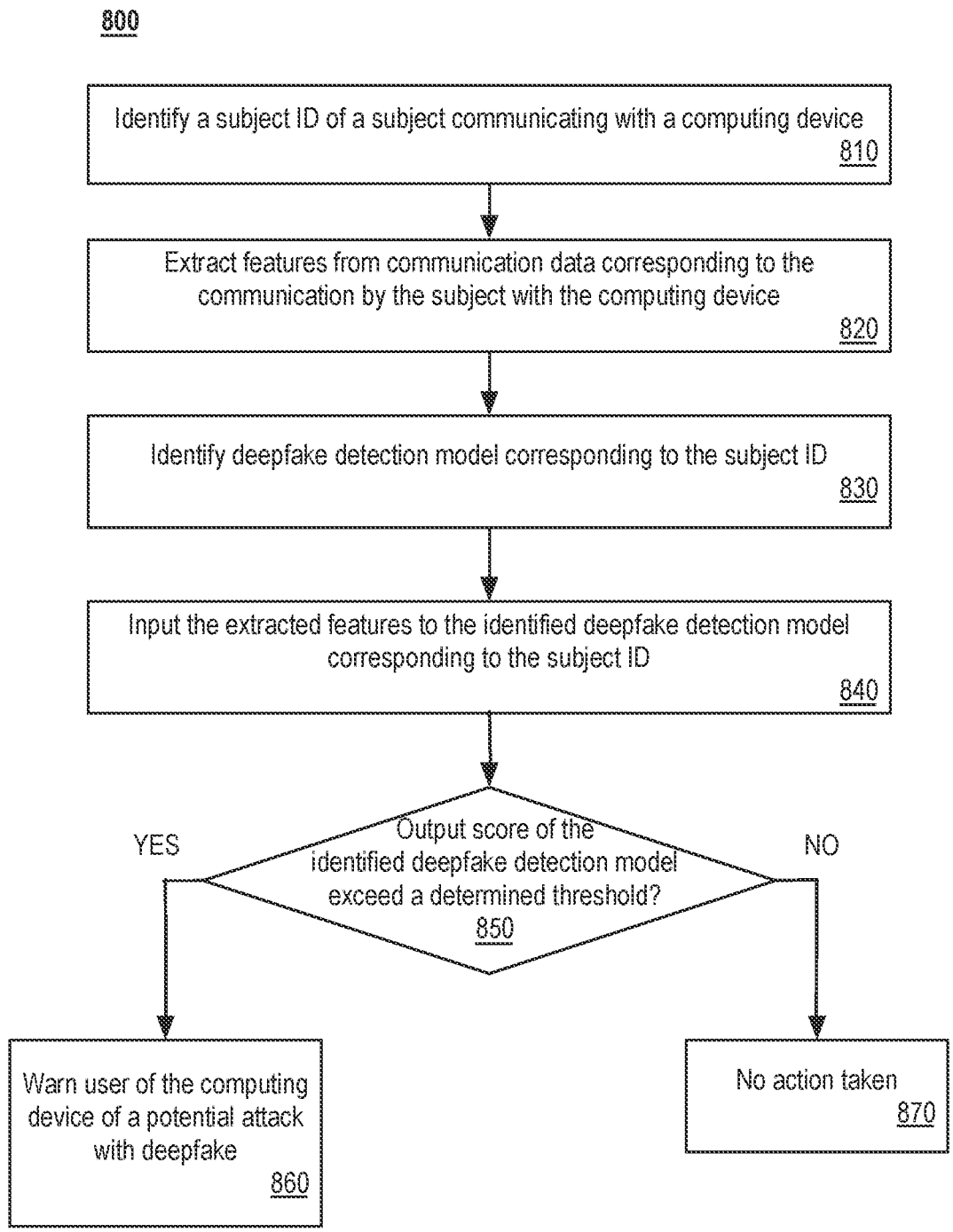
FIG. 8 is a flow diagram illustrating an embodiment of a method for inference using subject-specific deepfake detection models utilizing local subject-specific libraries.

FIG. 8 is a flow diagram illustrating an embodiment of a method 800 for inference using subject-specific deepfake detection models utilizing local subject-specific libraries. Method 800 may be performed by processing logic that may comprise hardware (e.g., circuitry, dedicated logic, programmable logic, etc.), software (such as instructions run on a processing device), or a combination thereof. More particularly, the method 800 may be implemented in one or more modules as a set of logic instructions stored in a machine- or computer-readable storage medium (also referred to herein as a non-transitory computer-readable storage medium) such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 800 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-7 may not be repeated or discussed hereafter. In one implementation, a processing device implementing a deepfake system 600 of FIG. 6, may perform method 800.

The example process of method 800 of FIG. 8 begins at block 810 where the processing device may identify a subject ID of a subject communicating with a computing device. Then, at block 820, the processing device may extract features from communication data corresponding to the communication by the subject with the computing device.

Subsequently, at block 830, the processing device may identify deepfake detection model corresponding to the subject ID. At block 840, the processing device may input the extracted features to the identified deepfake detection model corresponding to the subject ID.

Then, at decision block 850, the processing device may determine whether an output score of the identified deepfake detection model exceeds a determined threshold. If so, the method 800 proceeds to block 860 where the processing device may warn a user of the computing device of a potential attack using a deepfake. If, at decision block 850, the output score does not exceed the determined threshold, then method 800 proceeds to block 870 where no action is taken.

FIG. 9 is a flow diagram illustrating an embodiment of a method 900 for inference using subject-specific deepfake detection models utilizing shared subject-specific libraries. Method 900 may be performed by processing logic that may comprise hardware (e.g., circuitry, dedicated logic, programmable logic, etc.), software (such as instructions run on a processing device), or a combination thereof. More particularly, the method 900 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 900 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-8 may not be repeated or discussed hereafter. In one implementation, a processing device implementing a deepfake system 600 of FIG. 6 may perform method 900.

The example process of method 900 of FIG. 9 begins at block 910 where the processing device may receive deepfake query comprising an identification of a subject of interest and data pertaining to the subject of interest. Then, at block 920, the processing device may identify deepfake detection model corresponding to the identified subject of interest.

Subsequently, at block 930, the processing device may extract features from data pertaining to the subject of interest. At block 940, the processing device may input the extracted features to the identified deepfake detection model corresponding to the identified subject of interest.

Then, at decision block 950, the processing device may determine whether an output score of the identified deepfake detection model exceeds a determined threshold. If so, the method 900 proceeds to block 960 where the processing device may warn a user of the computing device of a potential attack using a deepfake. If, at decision block 950, the output score does not exceed the determined threshold, then method 900 proceeds to block 970 where no action is taken.

FIG. 10 is a flow diagram illustrating an embodiment of a method 1000 for deepfake detection models utilizing subject-specific libraries. Method 1000 may be performed by processing logic that may comprise hardware (e.g., circuitry, dedicated logic, programmable logic, etc.), software (such as instructions run on a processing device), or a combination thereof. More particularly, the method 1000 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 1000 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-9 may not be repeated or discussed hereafter. In one implementation, a processing device implementing a deepfake system 600 of FIG. 6 may perform method 1000.

The example process of method 1000 of FIG. 10 begins at block 1010 where the processing device may store a plurality of deepfake detection models corresponding to a plurality of subjects of interest. Then, at block 1020, the processing device may receive a query to identify whether data pertaining to a target subject of interest is a deepfake, the target subject of interest comprised in the plurality of subjects of interest and associated with a subject identifier (ID).

At block 1030, the processing device may identify deepfake detection model corresponding to the subject ID. Subsequently, at block 1040, the processing device may extract features for deepfake detection from the data.

At block 1050, the processing device may input the extracted features to the identified deepfake detection model corresponding to the subject ID. Lastly, at block 1060, the processing device may, responsive to an output of the deepfake detection model exceeding a determined deepfake threshold, generate a notification, in response to the query, indicating a possible deepfake attack corresponding to the target subject of interest.

Figure 11:
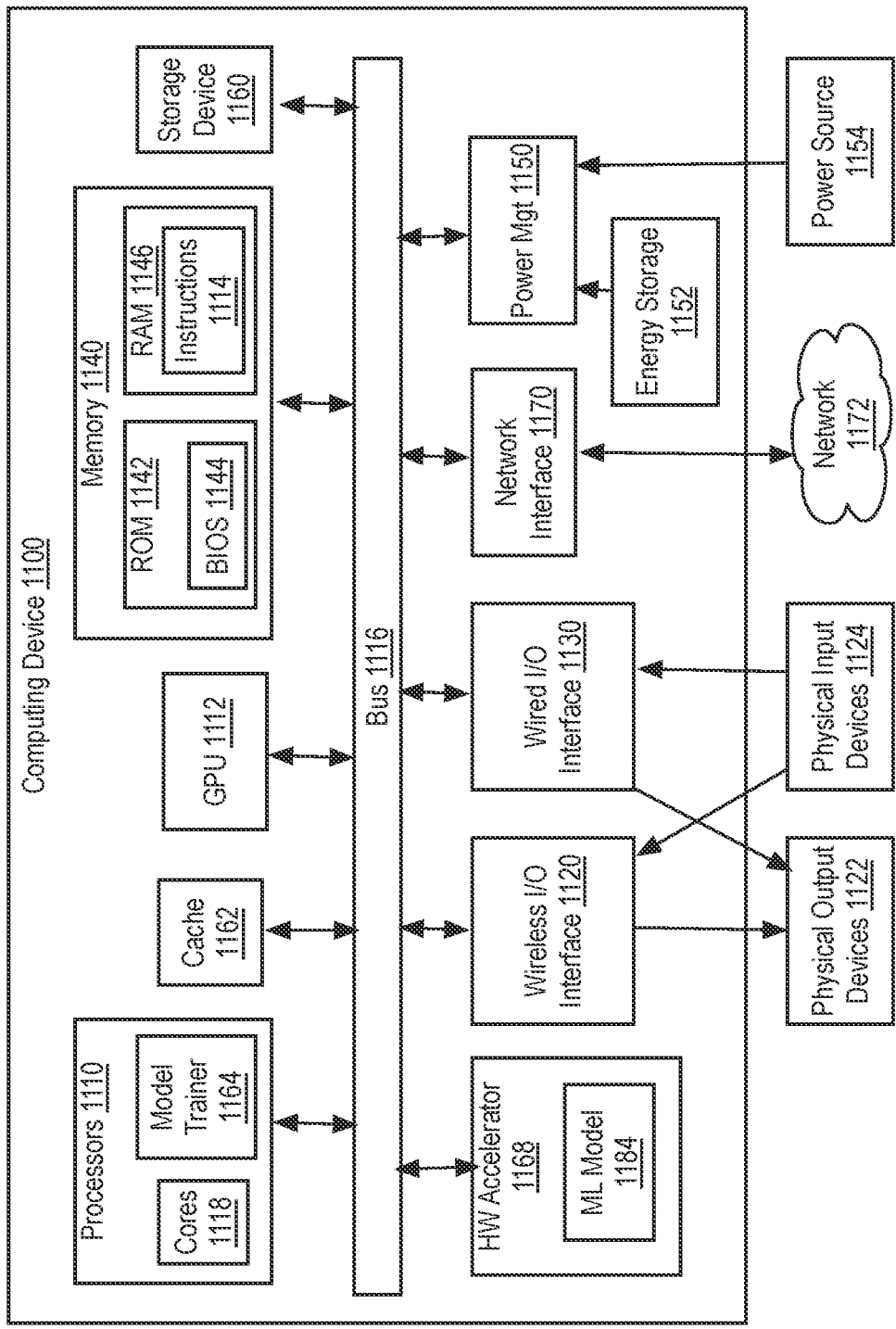
FIG. 11 is a schematic diagram of an illustrative electronic computing device to enable deepfake detection models utilizing subject-specific libraries, according to some implementations.

FIG. 11 is a schematic diagram of an illustrative electronic computing device to enable deepfake detection models utilizing subject-specific libraries, according to some embodiments. In some embodiments, the computing device 1100 includes one or more processors 1110 including one or more processors cores 1118 and a model trainer 1164, the model trainer 1164 to enable generator exploitation for deepfake detection, as provided in FIGS. 1-9. In some embodiments, the computing device 1100 includes a hardware accelerator 1168, the hardware accelerator including a machine learning model 1184. In some embodiments, the computing device is to implement deepfake detection models utilizing subject-specific libraries implementing the machine learning model 1184, as provided in FIGS. 1-10.

The computing device 1100 may additionally include one or more of the following: cache 1162, a graphical processing unit (GPU) 1112 (which may be the hardware accelerator in some implementations), a wireless input/output (I/O) interface 1120, a wired I/O interface 1130, memory circuitry 1140, power management circuitry 1150, non-transitory storage device 1160, and a network interface 1170 for connection to a network 1172. The following discussion provides a brief, general description of the components forming the illustrative computing device 1100. Example, non-limiting computing devices 1100 may include a desktop computing device, blade server device, workstation, or similar device or system.

In embodiments, the processor cores 1118 are capable of executing machine-readable instruction sets 1114, reading data and/or instruction sets 1114 from one or more storage devices 1160 and writing data to the one or more storage devices 1160. Those skilled in the relevant art can appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 1114 may include instructions to implement deepfake detection models utilizing subject-specific libraries, as provided in FIGS. 1-10.

The processor cores 1118 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 1100 includes a bus or similar communications link 1116 that communicably couples and facilitates the exchange of information and/or data between various system components including the processor cores 1118, the cache 1162, the graphics processor circuitry 1112, one or more wireless I/O interfaces 1120, one or more wired I/O interfaces 1130, one or more storage devices 1160, and/or one or more network interfaces 1170. The computing device 1100 may be referred to in the singular herein, but this is not intended to limit the embodiments to a single computing device 1100, since in some embodiments, there may be more than one computing device 1100 that incorporates, includes, or contains any number of communicably coupled, collocated, or remote networked circuits or devices.

The processor cores 1118 may include any number, type, or combination of currently available or future developed devices capable of executing machine-readable instruction sets.

The processor cores 1118 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 11 are of conventional design. Consequently, such blocks do not have to be described in further detail herein, as they can be understood by those skilled in the relevant art. The bus 1116 that interconnects at least some of the components of the computing device 1100 may employ any currently available or future developed serial or parallel bus structures or architectures.

The system memory 1140 may include read-only memory ("ROM") 1142 and random access memory ("RAM") 1146. A portion of the ROM 1142 may be used to store or otherwise retain a basic input/output system ("BIOS") 1144. The BIOS 1144 provides basic functionality to the computing device 1100, for example by causing the processor cores 1118 to load and/or execute one or more machine-readable instruction sets 1114. In embodiments, at least some of the one or more machine-readable instruction sets 1114 cause at least a portion of the processor cores 1118 to provide, create, produce, transition, and/or function as a dedicated, specific, and particular machine, for example a word processing machine, a digital image acquisition machine, a media playing machine, a gaming system, a communications device, a smartphone, or similar.

The computing device 1100 may include at least one wireless input/output (I/O) interface 1120. The at least one wireless I/O interface 1120 may be communicably coupled to one or more physical output devices 1122 (tactile devices, video displays, audio output devices, hardcopy output devices, etc.). The at least one wireless I/O interface 1120 may communicably couple to one or more physical input devices 1124 (pointing devices, touchscreens, keyboards, tactile devices, etc.). The at least one wireless I/O interface 1120 may include any currently available or future developed wireless I/O interface. Example wireless I/O interfaces include, but are not limited to: BLUETOOTH®, near field communication (NFC), and similar.

The computing device 1100 may include one or more wired input/output (I/O) interfaces 1130. The at least one wired I/O interface 1130 may be communicably coupled to one or more physical output devices 1122 (tactile devices, video displays, audio output devices, hardcopy output devices, etc.). The at least one wired I/O interface 1130 may be communicably coupled to one or more physical input devices 1124 (pointing devices, touchscreens, keyboards, tactile devices, etc.). The wired I/O interface 1130 may include any currently available or future developed I/O interface. Example wired I/O interfaces include, but are not limited to: universal serial bus (USB), IEEE 1394 ("FireWire"), and similar.

The computing device 1100 may include one or more communicably coupled, non-transitory, data storage devices 1160. The data storage devices 1160 may include one or more hard disk drives (HDDs) and/or one or more solid-state storage devices (SSDs). The one or more data storage devices 1160 may include any current or future developed storage appliances, network storage devices, and/or systems. Non-limiting examples of such data storage devices 1160 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 1160 may include one or more removable storage devices, such as one or more flash drives, flash memories, flash storage units, or similar appliances or devices capable of communicable coupling to and decoupling from the computing device 1100.

The one or more data storage devices 1160 may include interfaces or controllers (not shown) communicatively coupling the respective storage device or system to the bus 1116. The one or more data storage devices 1160 may store, retain, or otherwise contain machine-readable instruction sets, data structures, program modules, data stores, databases, logical structures, and/or other data useful to the processor cores 1118 and/or graphics processor circuitry 1112 and/or one or more applications executed on or by the processor cores 1118 and/or graphics processor circuitry 1112. In some instances, one or more data storage devices 1160 may be communicably coupled to the processor cores 1118, for example via the bus 1116 or via one or more wired communications interfaces 1130 (e.g., Universal Serial Bus or USB); one or more wireless communications interfaces 1120 (e.g., Bluetooth®, Near Field Communication or NFC); and/or one or more network interfaces 1170 (IEEE 802.3 or Ethernet, IEEE 802.10, or Wi-Fi®, etc.).

Processor-readable instruction sets 1114 and other programs, applications, logic sets, and/or modules may be stored in whole or in part in the system memory 1140. Such instruction sets 1114 may be transferred, in whole or in part, from the one or more data storage devices 1160. The instruction sets 1114 may be loaded, stored, or otherwise retained in system memory 1140, in whole or in part, during execution by the processor cores 1118 and/or graphics processor circuitry 1112.

The computing device 1100 may include power management circuitry 1150 that controls one or more operational aspects of the energy storage device 1152. In embodiments, the energy storage device 1152 may include one or more primary (i.e., non-rechargeable) or secondary (i.e., rechargeable) batteries or similar energy storage devices. In embodiments, the energy storage device 1152 may include one or more supercapacitors or ultracapacitors. In embodiments, the power management circuitry 1150 may alter, adjust, or control the flow of energy from an external power source 1154 to the energy storage device 1152 and/or to the computing device 1100. The power source 1154 may include, but is not limited to, a solar power system, a commercial electric grid, a portable generator, an external energy storage device, or any combination thereof.

For convenience, the processor cores 1118, the graphics processor circuitry 1112, the wireless I/O interface 1120, the wired I/O interface 1130, the storage device 1160, and the network interface 1170 are illustrated as communicatively coupled to each other via the bus 1116, thereby providing connectivity between the above-described components. In alternative embodiments, the above-described components may be communicatively coupled in a different manner than illustrated in FIG. 11. For example, one or more of the above-described components may be directly coupled to other components, or may be coupled to each other, via one or more intermediary components (not shown). In another example, one or more of the above-described components may be integrated into the processor cores 1118 and/or the graphics processor circuitry 1112. In some embodiments, all or a portion of the bus 1116 may be omitted and the components are coupled directly to each other using suitable wired or wireless connections.

Flowcharts representative of example hardware logic, machine readable instructions, hardware implemented state machines, and/or any combination thereof for implementing the system 100 of FIG. 1, for example, are shown in FIGS. 7-10. The machine readable instructions may be one or more executable programs or portion(s) of an executable program for execution by a computer processor such as the processor 1110 shown in the example computing device 1100 discussed above in connection with FIG. 11. The program may be embodied in software stored on a non-transitory computer readable storage medium such as a CD-ROM, a floppy disk, a hard drive, a DVD, a Blu-ray disk, or a memory associated with the processor 1110, but the entire program and/or parts thereof could alternatively be executed by a device other than the processor 1110 and/or embodied in firmware or dedicated hardware. Further, although the example program is described with reference to the flowcharts illustrated in FIGS. 7-10, many other methods of implementing the example systems may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 7-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it can be understood that such descriptors are used merely for ease of referencing multiple elements or components.

The following examples pertain to further embodiments. Example 1 is an apparatus to facilitate deepfake detection models utilizing subject-specific libraries. The apparatus of Example 1 comprises one or more processors to: store a plurality of deepfake detection models corresponding to a plurality of subjects of interest; receive a query to identify whether data pertaining to a target subject of interest is a deepfake, the target subject of interest comprised in the plurality of subjects of interest and associated with a subject identifier (ID); identify a deepfake detection model corresponding to the subject ID; extract features for deepfake detection from the data; input the extracted features to the identified deepfake detection model corresponding to the subject ID; and responsive to an output of the deepfake detection model exceeding a determined deepfake threshold, generate a notification, in response to the query, indicating a possible deepfake attack corresponding to the target subject of interest.

In Example 2, the subject matter of Example 1 can optionally include wherein the subjects of interest comprise people. In Example 3, the subject matter of any one of Examples 1-2 can optionally include wherein the data comprises at least one of images, video, audio, text, activity patterns, or mannerisms. In Example 4, the subject matter of any one of Examples 1-3 can optionally include wherein the plurality of deepfake detection models are stored on a local computing device and trained at the local computing device based on training features extracted from communication data with the plurality of subjects of interest at the local computing device.

In Example 5, the subject matter of any one of Examples 1-4 can optionally include wherein a deepfake detector on the local computing device is to interface with one or more communication applications executing on the local computing device to obtain the communication data to train the plurality of deepfake detection models. In Example 6, the subject matter of any one of Examples 1-5 can optionally include wherein the plurality of deepfake detection models are transmitted to a public computing device, the plurality of deepfake detection models at the public computing device utilized for access by a plurality of users to verify authenticity of media submitted by the plurality of users.

In Example 7, the subject matter of any one of Examples 1-6 can optionally include wherein the plurality of deepfake detection models are trained offline from the public computing device. In Example 8, the subject matter of any one of Examples 1-7 can optionally include wherein plurality of deepfake detection models comprise classifiers to distinguish synthetic data from authentic data. In Example 9, the subject matter of any one of Examples 1-8 can optionally include wherein plurality of deepfake detection models comprise at least one of distribution models, classifiers, or generative models.

Example 10 is a non-transitory computer-readable storage medium for facilitating deepfake detection models utilizing subject-specific libraries. The non-transitory computer-readable storage medium of Example 10 having stored thereon executable computer program instructions that, when executed by one or more processors, cause the one or more processors to perform operations comprising: storing a plurality of deepfake detection models corresponding to a plurality of subjects of interest; receiving a query to identify whether data pertaining to a target subject of interest is a deepfake, the target subject of interest comprised in the plurality of subjects of interest and associated with a subject identifier (ID); identifying a deepfake detection model corresponding to the subject ID; extracting features for deepfake detection from the data; inputting the extracted features to the identified deepfake detection model corresponding to the subject ID; and responsive to an output of the deepfake detection model exceeding a determined deepfake threshold, generating a notification, in response to the query, indicating a possible deepfake attack corresponding to the target subject of interest.

In Example 11, the subject matter of Example 10 can optionally include wherein the subjects of interest comprise people. In Example 12, the subject matter of Examples 10-11 can optionally include wherein the data comprises at least one of images, video, audio, text, activity patterns, or mannerisms. In Example 13, the subject matter of Examples 10-12 can optionally include wherein the plurality of deepfake detection models are stored on a local computing device and trained at the local computing device based on training features extracted from communication data with the plurality of subjects of interest at the local computing device.

In Example 14, the subject matter of Examples 10-13 can optionally include wherein a deepfake detector on the local computing device is to interface with one or more communication applications executing on the local computing device to obtain the communication data to train the plurality of deepfake detection models. In Example 15, the subject matter of Examples 10-14 can optionally include wherein the plurality of deepfake detection models are transmitted to a public computing device, the plurality of deepfake detection models at the public computing device utilized for access by a plurality of users to verify authenticity of media submitted by the plurality of users.

Example 16 is a method for facilitating deepfake detection models utilizing subject-specific libraries. The method of Example 16 can include storing, by a processing device, a plurality of deepfake detection models corresponding to a plurality of subjects of interest; receiving a query to identify whether data pertaining to a target subject of interest is a deepfake, the target subject of interest comprised in the plurality of subjects of interest and associated with a subject identifier (ID); identifying a deepfake detection model corresponding to the subject ID; extracting features for deepfake detection from the data; inputting the extracted features to the identified deepfake detection model corresponding to the subject ID; and responsive to an output of the deepfake detection model exceeding a determined deepfake threshold, generating a notification, in response to the query, indicating a possible deepfake attack corresponding to the target subject of interest.

In Example 17, the subject matter of Example 16 can optionally include wherein the data comprises at least one of images, video, audio, text, activity patterns, or mannerisms. In Example 18, the subject matter of Examples 16-17 can optionally include wherein the plurality of deepfake detection models are stored on a local computing device and trained at the local computing device based on training features extracted from communication data with the plurality of subjects of interest at the local computing device.

In Example 19, the subject matter of Examples 16-18 can optionally include wherein a deepfake detector on the local computing device is to interface with one or more communication applications executing on the local computing device to obtain the communication data to train the plurality of deepfake detection models. In Example 20, the subject matter of Examples 16-19 can optionally include wherein the plurality of deepfake detection models are transmitted to a public computing device, the plurality of deepfake detection models at the public computing device utilized for access by a plurality of users to verify authenticity of media submitted by the plurality of users.

Example 21 is a system for facilitating deepfake detection models utilizing subject-specific libraries. The system of Example 21 can optionally include a memory to store a block of data, and a processor communicably coupled to the memory to: store a plurality of deepfake detection models corresponding to a plurality of subjects of interest; receive a query to identify whether data pertaining to a target subject of interest is a deepfake, the target subject of interest comprised in the plurality of subjects of interest and associated with a subject identifier (ID); identify a deepfake detection model corresponding to the subject ID; extract features for deepfake detection from the data; input the extracted features to the identified deepfake detection model corresponding to the subject ID; and responsive to an output of the deepfake detection model exceeding a determined deepfake threshold, generate a notification, in response to the query, indicating a possible deepfake attack corresponding to the target subject of interest.

In Example 22, the subject matter of Example 21 can optionally include wherein the subjects of interest comprise people. In Example 23, the subject matter of any one of Examples 21-22 can optionally include wherein the data comprises at least one of images, video, audio, text, activity patterns, or mannerisms. In Example 24, the subject matter of any one of Examples 21-23 can optionally include wherein the plurality of deepfake detection models are stored on a local computing device and trained at the local computing device based on training features extracted from communication data with the plurality of subjects of interest at the local computing device.

In Example 25, the subject matter of any one of Examples 21-24 can optionally include wherein a deepfake detector on the local computing device is to interface with one or more communication applications executing on the local computing device to obtain the communication data to train the plurality of deepfake detection models. In Example 26, the subject matter of any one of Examples 21-25 can optionally include wherein the plurality of deepfake detection models are transmitted to a public computing device, the plurality of deepfake detection models at the public computing device utilized for access by a plurality of users to verify authenticity of media submitted by the plurality of users.

In Example 27, the subject matter of any one of Examples 21-26 can optionally include wherein the plurality of deepfake detection models are trained offline from the public computing device. In Example 28, the subject matter of any one of Examples 21-27 can optionally include wherein plurality of deepfake detection models comprise classifiers to distinguish synthetic data from authentic data. In Example 29, the subject matter of any one of Examples 21-28 can optionally include wherein plurality of deepfake detection models comprise at least one of distribution models, classifiers, or generative models.

Example 30 is an apparatus for facilitating deepfake detection models utilizing subject-specific libraries, comprising means for storing a plurality of deepfake detection models corresponding to a plurality of subjects of interest; means for receiving a query to identify whether data pertaining to a target subject of interest is a deepfake, the target subject of interest comprised in the plurality of subjects of interest and associated with a subject identifier (ID); means for identifying a deepfake detection model corresponding to the subject ID; means for extracting features for deepfake detection from the data; means for inputting the extracted features to the identified deepfake detection model corresponding to the subject ID; and responsive to an output of the deepfake detection model exceeding a determined deepfake threshold, means for generating a notification, in response to the query, indicating a possible deepfake attack corresponding to the target subject of interest. In Example 31, the subject matter of Example 30 can optionally include the apparatus further configured to perform the method of any one of the Examples 17 to 20.

Example 32 is at least one machine readable medium comprising a plurality of instructions that in response to being executed on a computing device, cause the computing device to carry out a method according to any one of Examples 16-20. Example 33 is an apparatus for facilitating deepfake detection models utilizing subject-specific libraries, configured to perform the method of any one of Examples 16-20. Example 34 is an apparatus for facilitating deepfake detection models utilizing subject-specific libraries, comprising means for performing the method of any one of claims 16 to 20. Specifics in the Examples may be used anywhere in one or more embodiments.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. An apparatus comprising:
one or more processors to:
store a plurality of deepfake detection models corresponding to a plurality of subjects of interest, wherein the plurality of deepfake detection models are each generated using subject-specific data collected for a corresponding subject of interest of the plurality of subjects of interest and the plurality of deepfake detection models are trained using the subject-specific data to distinguish synthetic data from authentic data corresponding to the plurality of subjects of interest;
receive a query to identify whether data pertaining to a target subject of interest is a deepfake, the target subject of interest comprised in the plurality of subjects of interest and associated with a subject identifier (ID);
identify, using the subject ID, a deepfake detection model corresponding to the subject ID from the plurality of deepfake detection models;
extract features for deepfake detection from the data pertaining to the target subject of interest, wherein the features comprise a combination of face, voice, and text corresponding to the target subject of interest;
input the features to the deepfake detection model corresponding to the subject ID; and
responsive to an output of the deepfake detection model satisfying a determined deepfake threshold, generate a notification, in response to the query, indicating a possible deepfake attack corresponding to the target subject of interest;
wherein the plurality of deepfake detection models are stored on a local computing device and trained at the local computing device based on training features extracted from communication data with the plurality of subjects of interest at the local computing device and based on synthetic deepfake data of the plurality of subjects of interest created at the local computing device.

2. The apparatus of claim 1, wherein the plurality of subjects of interest comprise people.

3. The apparatus of claim 1, wherein the data comprises at least one of images, video, audio, text, activity patterns, or mannerisms.

4. The apparatus of claim 1, wherein a deepfake detector on the local computing device is to interface with one or more communication applications executing on the local computing device to obtain the communication data to train the plurality of deepfake detection models.

5. The apparatus of claim 4, wherein the plurality of deepfake detection models are transmitted to a public computing device, the plurality of deepfake detection models at the public computing device utilized for access by a plurality of users to verify authenticity of media submitted by the plurality of users.

6. The apparatus of claim 5, wherein the plurality of deepfake detection models are trained offline from the public computing device.

7. The apparatus of claim 1, wherein the plurality of deepfake detection models comprise classifiers to distinguish the synthetic data from the authentic data.

8. The apparatus of claim 1, wherein the plurality of deepfake detection models comprise at least one of distribution models, classifiers, or generative models.

9. A non-transitory computer-readable storage medium having stored thereon executable computer program instructions that, when executed by one or more processors, cause the one or more processors to perform operations comprising:
- storing a plurality of deepfake detection models corresponding to a plurality of subjects of interest, wherein the plurality of deepfake detection models are each generated using subject-specific data collected for a corresponding subject of interest of the plurality of subjects of interest and the plurality of deepfake detection models are trained using the subject-specific data to distinguish synthetic data from authentic data corresponding to the plurality of subjects of interest;
- receiving a query to identify whether data pertaining to a target subject of interest is a deepfake, the target subject of interest comprised in the plurality of subjects of interest and associated with a subject identifier (ID);
- identifying, using the subject ID, a deepfake detection model corresponding to the subject ID from the plurality of deepfake detection models;
- extracting features for deepfake detection from the data pertaining to the target subject of interest, wherein the features comprise a combination of face, voice, and text corresponding to the target subject of interest;
- inputting the features to the deepfake detection model corresponding to the subject ID; and
- responsive to an output of the deepfake detection model satisfying a determined deepfake threshold, generating a notification, in response to the query, indicating a possible deepfake attack corresponding to the target subject of interest;
- wherein the plurality of deepfake detection models are stored on a local computing device and trained at the local computing device based on training features extracted from communication data with the plurality of subjects of interest at the local computing device and based on synthetic deepfake data of the plurality of subjects of interest created at the local computing device.

10. The non-transitory computer-readable storage medium of claim 9, wherein the plurality of subjects of interest comprise people.

11. The non-transitory computer-readable storage medium of claim 9, wherein the data comprises at least one of images, video, audio, text, activity patterns, or mannerisms.

12. The non-transitory computer-readable storage medium of claim 9, wherein a deepfake detector on the local computing device is to interface with one or more communication applications executing on the local computing device to obtain the communication data to train the plurality of deepfake detection models.

13. The non-transitory computer-readable storage medium of claim 12, wherein the plurality of deepfake detection models are transmitted to a public computing device, the plurality of deepfake detection models at the public computing device utilized for access by a plurality of users to verify authenticity of media submitted by the plurality of users.

14. The non-transitory computer-readable storage medium of claim 9, wherein the plurality of deepfake detection models comprise classifiers to distinguish the synthetic data from the authentic data.

15. The non-transitory computer-readable storage medium of claim 9, wherein the plurality of deepfake detection models comprise at least one of distribution models, classifiers, or generative models.

16. A method comprising:
- storing, by a processing device, a plurality of deepfake detection models corresponding to a plurality of subjects of interest, wherein the plurality of deepfake detection models are each generated using subject-specific data collected for a corresponding subject of interest of the plurality of subjects of interest and the plurality of deepfake detection models are trained using the subject-specific data to distinguish synthetic data from authentic data corresponding to the plurality of subjects of interest;
- receiving a query to identify whether data pertaining to a target subject of interest is a deepfake, the target subject of interest comprised in the plurality of subjects of interest and associated with a subject identifier (ID);
- identifying, using the subject ID, a deepfake detection model corresponding to the subject ID from the plurality of deepfake detection models;
- extracting features for deepfake detection from the data pertaining to the target subject of interest, wherein the features comprise a combination of face, voice, and text corresponding to the target subject of interest;
- inputting the features to the deepfake detection model corresponding to the subject ID; and
- responsive to an output of the deepfake detection model satisfying a determined deepfake threshold, generating a notification, in response to the query, indicating a possible deepfake attack corresponding to the target subject of interest;
- wherein the plurality of deepfake detection models are stored on a local computing device and trained at the local computing device based on training features extracted from communication data with the plurality of subjects of interest at the local computing device and based on synthetic deepfake data of the plurality of subjects of interest created at the local computing device.

17. The method of claim 16, wherein the data comprises at least one of images, video, audio, text, activity patterns, or mannerisms.

18. The method of claim 16, wherein a deepfake detector on the local computing device is to interface with one or more communication applications executing on the local computing device to obtain the communication data to train the plurality of deepfake detection models.

19. The method of claim 18, wherein the plurality of deepfake detection models are transmitted to a public computing device, the plurality of deepfake detection models at the public computing device utilized for access by a plurality of users to verify authenticity of media submitted by the plurality of users.

20. The method of claim 16, wherein the plurality of deepfake detection models comprise classifiers to distinguish the synthetic data from the authentic data.

* * * * *